(12) United States Patent
Uryu (10) Patent No.: US 6,542,186 B2
(45) Date of Patent: *Apr. 1, 2003

(54) DIGITAL CAMERA WITH DETACHABLE MEMORY MEDIUM

(75) Inventor: Takeshi Uryu, Hachioji (JP)

(73) Assignee: Konica Corporation, Hachioji (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,489

(22) Filed: Mar. 31, 1998

(65) Prior Publication Data

US 2003/0011690 A1 Jan. 16, 2003

(30) Foreign Application Priority Data

Apr. 3, 1997 (JP) ............................................. 9-084917

(51) Int. Cl.[7] .............................................. H04N 5/76
(52) U.S. Cl. ................................ 348/231.7; 348/231.7; 348/231.6
(58) Field of Search ............................... 348/230, 231, 348/232, 233, 207, 287.99, 230.1, 231.99, 231.6, 231.7, 231.9; 386/46, 94; 360/15, 13, 12; 235/487, 492, 475, 441, 486, 495

(56) References Cited

U.S. PATENT DOCUMENTS

| | | | | | |
|---|---|---|---|---|---|
| 5,179,505 | A | * | 1/1993 | Matsuo | 235/495 |
| 5,563,396 | A | * | 10/1996 | Wakui | 235/441 |
| 5,657,081 | A | * | 8/1997 | Kurahashi | 348/233 |
| 5,805,219 | A | * | 9/1998 | Ejima et al. | 348/233 |
| 5,821,996 | A | * | 10/1998 | Kawamura et al. | 348/232 |
| 6,067,398 | A | * | 5/2000 | Sato | 386/46 |
| 6,239,837 | B1 | * | 5/2001 | Yamada et al. | 348/231 |

* cited by examiner

Primary Examiner—Aung S. Moe (57) ABSTRACT

In a camera provided with a photographing element to convert image information into electric image data, and a memory mounting section on which a memory is mounted; a sensor detects a condition that the memory is being demounted from the memory mounting section and ouputs a demounting detecting signal and a controller prevents the memory from being demounted from the memory mounting section in response to the demounting detecting signal while the memory is accessed.

4 Claims, 9 Drawing Sheets

DIGITAL CAMERA WITH DETACHABLE MEMORY MEDIUM

BACKGROUND OF THE INVENTION

This invention relates to a digital still camera, and in particular to a digital still camera using a memory card as a recording medium, said memory card being mounted to the camera body in a manner such that it is capable of mounting and demounting.

In recent years, it has been put to practical use a still camera which has such a structure as to make the optical image of a subject focus onto a solid state image sensor such as a CCD through an optical imaging system such as a photographing lens, a stop, and so forth, and to convert the outputted electrical image signal which has been photoelectrically converted by the image sensor into digital data, said digital image data being recorded in a semiconductor memory comprised in a memory card which is mounted to the camera body in such a way that it is capable of mounting and demounting.

However, in case of the memory card for recording the image signal being capable of mounting and demounting to the camera body as mentioned above, there has been a possibility for the memory card to be demounted inadvertently by the user even while the memory card is being accessed.

The aforesaid access to the memory card is done with the processes such as recording of the photographed image, reading of the recorded image data, processing of the recorded image data, and so forth. Accordingly, there is a possibility for the memory card to be demounted during such processes, and in pariticular, in case of using a flash memory for the simiconductor memory, it is required to erase null data so as to make a free area, and besides it requires a comparatively long time to erase said null data, hence there has been a problem that the possibility for the memory card to be demounted inadvertently during such erasing process of the null data as mentioned above.

SUMMARY OF THE INVENTION

This invention is made in view of the above-mentioned problem, and the object of it is to provide a digital still camera capable of avoiding the inadvertent demounting of the memory card during the access to it.

For that purpose, according to the following structure in the first mode of practice of the invention, the digital still camera, which has a structure such that a memory card comprising a memory capable of mounting and demounting is mounted to the camera body and the optical image of a subject is converted to an electrical image signal to record it in said memory, is provided with a means for detecting the operational state preceding the demounting of said memory card out of the camera body, and a warning means for giving a warning on the occasion of detecting said operational state by said detecting means during the access to said memory card.

By the structure as mentioned above, it is detected that the memory card is going to be demounted and if it happens during the access to the memory card, the warning is given not to carry out the demounting operation because the memory card is in the state of accessing to it, and accordingly it is prevented that the operation is continued to demount the memory card.

The operational state preceding the demounting of the memory card as stated herein means the operational state in any step before undoing the electrical connection between the memory card and the camera body in the operational procedure. Further, it is desirable to use an LED or a buzzer for the warning means, but a letter display of an warning sentence may well be used, that is, any means that can inform the user of the requirement not to demount the memory card will do.

On the other hand, according to the following structure in the second mode of practice of the invention, the digital still camera, which has a structure such that a memory card comprising a memory capable of mounting and demounting is mounted to the camera body and the optical image of a subject is converted to an electrical image signal to record it in said memory, is provided with a means for detecting the operational state preceding the demounting of said memory card out of the camera body, and a mechanical locking means to make it unable for the memory card to be demounted by mechanically locking said memory card to the camera body on the occasion of detecting said operational state by said detecting means during the access to said memory card.

By the structure as mentioned above, when it is detected that the memory card is going to be demounted and if it happens during the access to the memory card, the memory card is mechanically locked to the camera body so as not to be demounted by the user in order to prevent that the operation is continued to demount the memory card.

In other words, the aforesaid locking means does not lock the memory card so long as the demounting operation is not carried out even during the accessing to the memory card, however, it forces the memory card to be locked to make it unable to be demounted if the demounting operation is attempted during the accessing.

In the following structure according to the third mode of the invention, the digital still camera is further provided with the warning means for giving the warning that the memory card is unable to be demounted by the aforesaid locking means.

By the struture as mentioned above, the user can be informed that the state of being unable to be demounted for the memory card is due to the action of the locking means for preventing the demounting of the memory card during the access. In this case too, an LED or a buzzer should deseirably be used for the warning means.

According to the following structure in the forth mode of practice of the invention, the digital still camera is comprised of a mounting portion of the aforesaid memory card provided at the aforesaid camera body, the mounting portion covered by a card cover, and the aforesaid demounting detecting means detects the opening of said card cover as the operational state preceding the demounting of said memory card out of the camera body.

In the structure as mentioned above, it may happen with a good possibility that the memory card will be demounted next when the aforesaid card cover is opened because the opening of the aforesaid card cover is the precondition of the demounting of the memory card. Therefore, when the card cover is opened and if it happens during the access to the memory card, the carrying out of the demounting of the memory card following the opening of the card cover is prevented by giving a warning or locking the memory card to make it unable to be demounted.

However, the operational state preceding the demounting of the memory card is not limited to the above-mentioned opening of the card cover, and for example, it will also do to detect touching the eject button or the lock-releasing button (or that the operation has been carried out to the step immediately before demounting is actually made). In other words, any operational state will do before the step of electrical disconnection among a series of demounting operations for the memory card, and it is favorable that detecting the earlier operational state than the last one of the two or more required operations of different kind for the demounting (the opening of the card cover and the drawing out of the memory card, for example).

According to the following structure in the fifth mode of practice of the invention, the digital still camera has a structure such that the aforesaid operational state is detected by the aforesaid demounting detecting means during the accessing to the aforesaid memory card, and if the accessing process can be serially in time divided into plural process units, an access-discontinuing means is provided for discontinuing the process at the time of finishing the unit in processing.

By the structure as mentioned above, if the content of the processing can be divided in time series, it is not required to wait until all the process units is finished for avoiding the demounting of the memory card due to the waring or locking, but it is made to be allowed earlier to demount the memory card at the step of finishing the process unit in processing.

According to the following structure in the sixth mode of practice of the invention, the digital still camera has a structure such that the aforesaid memory comprised in the memory card is a flash memory, having such structure that the control process is carried out in unit-by-unit manner for the predetermined erasing block units, said control process producing free area by erasing only the null data made on the occasion of rewriting the data, and when the aforesaid operational state is detected by the aforesaid demounting detecting means during the aforesaid access for erasing, the erasing process is discontinued at the time of finishing the erasing of the erasing block unit in processing.

By the structure as mentioned above, if the operation of demounting of the memory card is attempted during the erasing process of the null data, it is not required to wait until the erasing process for all the erasing block units is finished for avoiding the demounting of the memory card, but it is made to be allowed to demount the memory card at the step of finishing the erasing of the erasing block unit in processing at that time, while the erasing block units which have not been erased remain as unerased.

By the structure as set forth in the first mode of practice of the invention, such effect is obtained that when the operation to demount the memory card is going to be carried out during the access, the warning is given to inform the user that the memory card is in the process of accessing, hence it can be avoided that the user will inadvertently demount the memory card.

By the structure as set forth in the second mode of practice of the invention, such effect is obtained that when the operation to demount the memory card is going to be carried out during the access, the memory card is forced to be locked to enter in the state of being unable to be demounted even if the user tries to demount it, hence it can be securely prevented that the memory card is demounted during the access to it.

By the structure as set forth in the third mode of practice of the invention, such effect is obtained that when the memory card is going to be demounted, the memory card is locked and at the same time the warning is given to inform the user that locking is made because the memory card is in the process of accessing, hence the user can be realized that the memory card is locked because of the attempt to demount it during the access.

By the structure as set forth in the fourth mode of practice of the invention, such effect is obtained that when there is some possibility of making the demounting operation upon opening the card cover covering the memory card mounting portion, it is prevented that the memory card in the process of accessing is demounted following the opening operation of the card cover, by warning the user of the memory in accessing, or locking the memory card.

By the structure as set forth in the fifth mode of practice of the invention, such effect is obtained that by discontinuing the accessing process, the state of being capable of demounting the memory card can be made to be recovered in a short time after the demounting operation is about to be done.

By the structure as set forth in the sixth mode of practice of the invention, such effect is obtained that the demounting operation of the memory card is not hindered for a comparatively long time until the erasing of all the null data in the flash memory is finished, but the demounting of the memory card can be allowed in a short time.

DETAILED DESCRIPTION OF THE PREFERRED EMBODIMENT

Hereinafter the embodiment of this invention will be disclosed.

Figure 1:
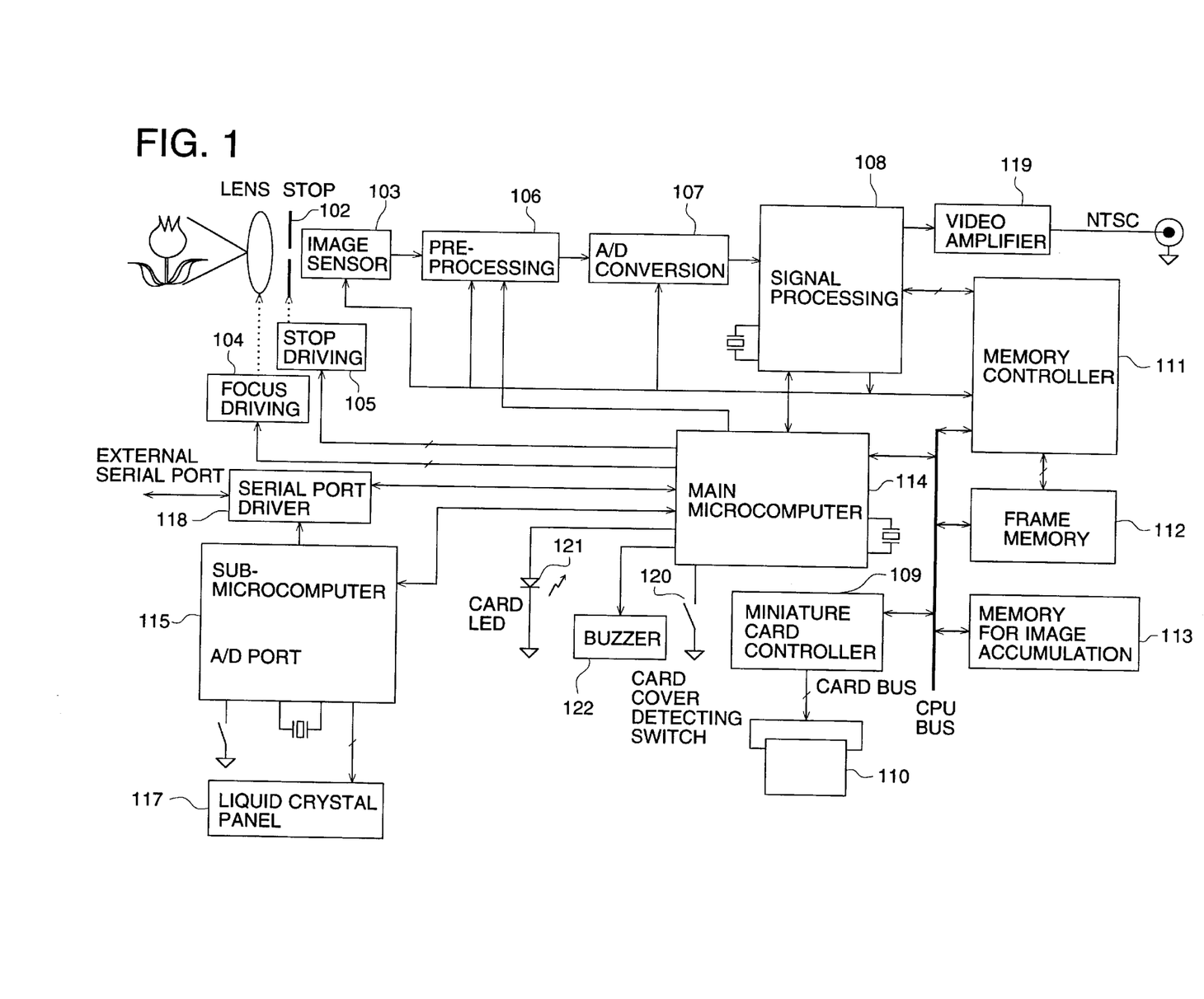
FIG. 1 is a block diagram showing the system structure of the still video camera according to the embodiment of the invention.

FIG. 1 shows the system structure of the digital still camera according to the embodiment.

With reference to the drawing, the optical image of a subject obtained through the optical system composed of the imaging lens 101, the stop 102, and so forth is focused on the light receiving surface of an image sensor such as a CCD 103. Further, in this case, the focus lens 101 and the stop 102 are driven by the focus driving circuit 104 and the stop driving circuit 105 respectively.

The above-mentioned CCD 103 composing the image sensor converts the optical image focused on the light receiving surface into a pattern of electrical charge and outputs the analogue image signal. The analogue image signal outputted from the CCD 103 is subjected to the noise reduction processing, gain controlling, and so forth. Furthermore, it is converted into the digital image signal by the A/D converter 107, and it is inputted to the signal processing circuit 108, where it is subjected to the brightness processing, color processing, data compression processing, and so forth, and finally it is recorded in the memory card 110 through the card controller 109.

The memory controller 111 causes the digital image signal before processing to be recorded temporarily, and after being processed, to be memorized in the memory for image accumulation 113; thus the digital image signal memorized in said memory for image accumulation is recorded in the memory card 110 by said card controller 109.

Said memory card 110 comprises in it a flash memory (flash type EEPROM), and is mounted to the camera body in such a manner that it is capable of mounting and demounting.

The main microcomputer 114 carries out the control of the operation of the aforesaid focus driving circuit 104, stop driving circuit 105, the pre-processing circuit 106, the aforesaid signal processing circuit 108, and so forth.

The sub-microcomputer 115 makes the control of the liquid crystal panel 117 etc.

Further, the photographed image signal can be outputted as the NTSC video signal through the video amplifier 119.

Besides, the image signal can be transmitted to computers and others through the serial driver 118, which is controlled by the main microcomputer 114, and through an external serial port.

The above-mentioned flash memory comprised in the aforesaid memory card 110 has a structure such that when there are an effective data area (a latest data area) and a null data area (an old data area) mixedly in some erasing unit (erasing unit 1, for example), such process is made that the null data area is erased to produce a free area in a manner such that only the data in the effective data area is written in a spare unit to adress it anew an erasing unit 1, while the old erasing unit is to be used as a new spare unit with all its data erased; hereinafter the process to erase the null data to produce a free area in the above-mentioned manner is referred to as 'reclaim'.

Figure 2:
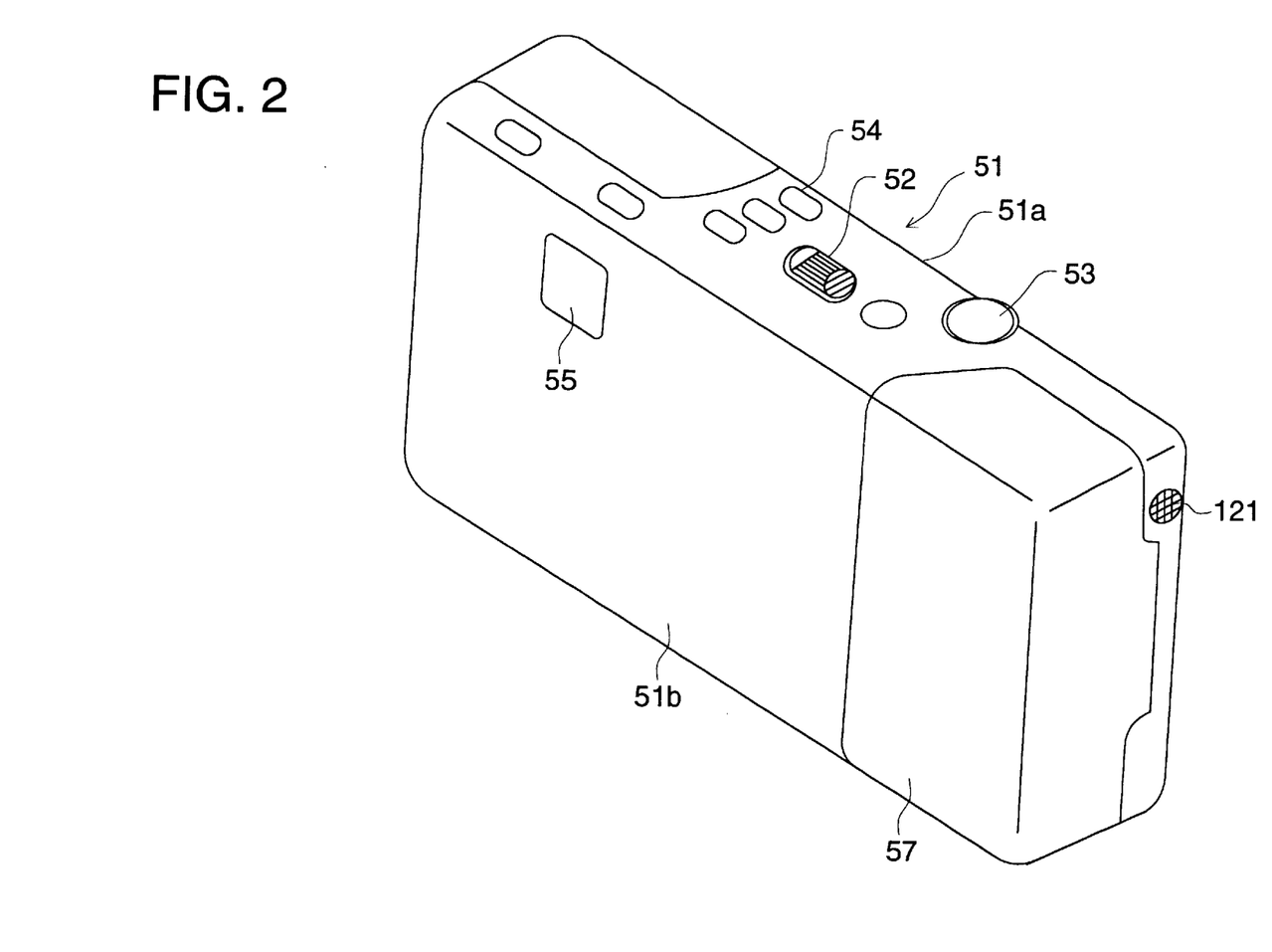
FIG. 2 is a perspective view of the appearance of the still video camera according to the aforesaid embodiment.
Figure 3:
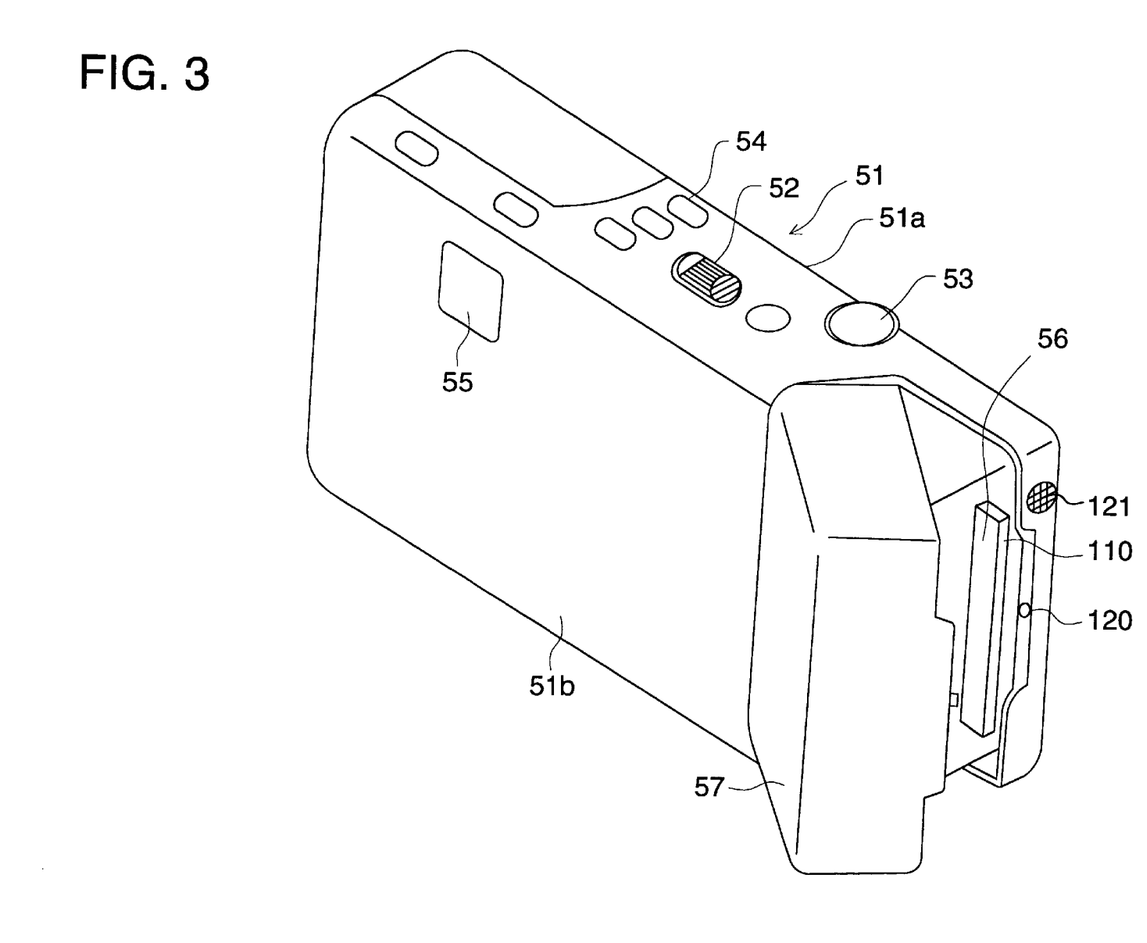
FIG. 3 is another perspective view of the appearance of the still video camera according to the aforesaid embodiment.

FIG. 2 and FIG. 3 are a perspective view from the backside of the digital still camera according to the embodiment of the invention. On the top surface 51a of the camera body 51, there are provided the main switch 52, release switch 53, mode switch 54, and so forth, and on the back surface 51b the finder window 55 is provided.

Further, on the right side 51c the opening for the insertion 56 to mount the memory card 110 in a manner such that it is capable of mounting and demounting. By inserting the memory card 110 with its terminal-provided side made as the front side, the terminal of the camera body provided at the innermost portion of said opening for insertion 56 is fitted with the terminal on the side of the memory card; thus the memory card 110 is electrically connected to the camera body 51 and at the same time the memory card 110 is held in said opening for insertion 56.

In addition, the card cover 57 which covers the aforesaid opening for insertion 56 is supported by the camera body in the manner capable of opening and closing, and the operation for mounting and demounting the memory card 110 is carried out with said cover 57 opened. On said card cover 57 there is provided the card cover detecting switch 120 for detecting whether the card cover 57 is opened or closed.

Besides, the mounting mechanism for the memory card 110 should not be limited to the above-mentioned insertion type.

Now the the device for avoiding the demounting (being drawn out) of the memory card in accessing from the camera body 51 as shown in the following will be explained.

Figure 4:
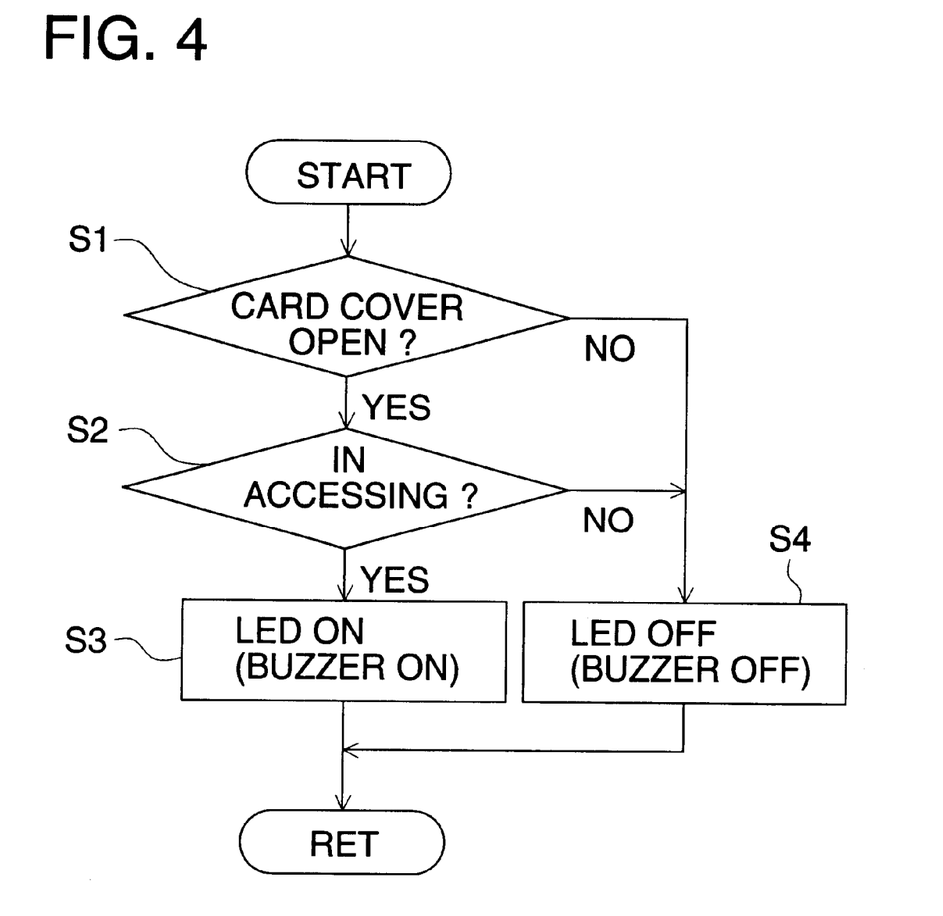
FIG. 4 is a flow chart showing the control to avoid the demounting of the memory card in accessing by the warning.

In the flow chart of FIG. 4, first, in the step 1 (denoted by S1 in the drawing; likewise in the following) it is judged whether the card cover is opened or closed by the aforesaid card cover detecting switch 120.

Because the demounting of the memory card 110 is possible only in the state of opening of the card cover, and usually the operation is made in such a way that the memory card is drawn out with its edge portion protruded out of the camera body 51 held by the operator, the state of opened card cover 57 corresponds to the operational state preceding the demounting of the memory card 110 from the camera body 51. Accordingly, the aforesaid card cover detecting switch 120 can be regarded as the demounting detecting means in this embodiment.

If the card cover 57 is opened, the procedure enters in the step 2 to judge whether the memory card 110 is in accessing or not. The access to the memory card is made during the recording of the photographed image, processing of the signal such as erasing and working of the image, the aforesaid reclaiming, and so forth.

If the judge is on the side of being 'in accessing', there is some possibility of the demounting of the memory card 110 in accessing, hence the procedure enters in the step 3 and the LED 121 for the warning is made to be on so as to inform the user that the demounting (drawing out) of the memory card 110 should not be carried out because it is in accessing.

Owing to this, when the card cover 57 is opened by the user to draw out the memory card 110 without noticing that it is in accessing, the LED 121 is turned on to give warning before the memory card 110 is drawn out, hence it is possible to make the user give up taking out the memory card 110.

Moreover, in the above-mentioned structure, the LED 121 is used for the warning means, however, it will do well the structure in which the buzzer 122 is made to buzz instead of the LED 121 or together with the LED 121. Also it will do well the structure in which the warning sentence to prohibit drawing out the memory card 110 is displayed by letters.

If the card cover is closed, or if the memory card 110 is not in accessing even with the card cover opened, the procedure goes to the step 4 and the aforesaid LED 121 is made to be off. That is, when the card cover 57 is closed, it is unable to draw out the memory card 110 and the warning is not required regardless of whether it is in accessing or not, and if it is not in accessing even with the card cover 57 opened, the warning is not made because it is of no problem to allow the user to draw out the memory card 110.

However, even if the warning is made for the user so as not to draw out the memory card 110 by the LED 121 or buzzer 122 as mentioned above, still there is some possibility for the memory card to be taken out, in case where the warning does not function effectively because the user is not experienced or the drawing out operation is continuously done immediately subsequent to the opening operation of the card cover 57.

Therefore, it is favorable a structure such that when the memory card 110 is about to be demounted, it is mechanically locked to make it unable to be demounted inadvertently, and at the same time, the user is given the warning that the memory card 110 is in accessing by such warning means as the LED 121 and the buzzer 122.

Figure 5:
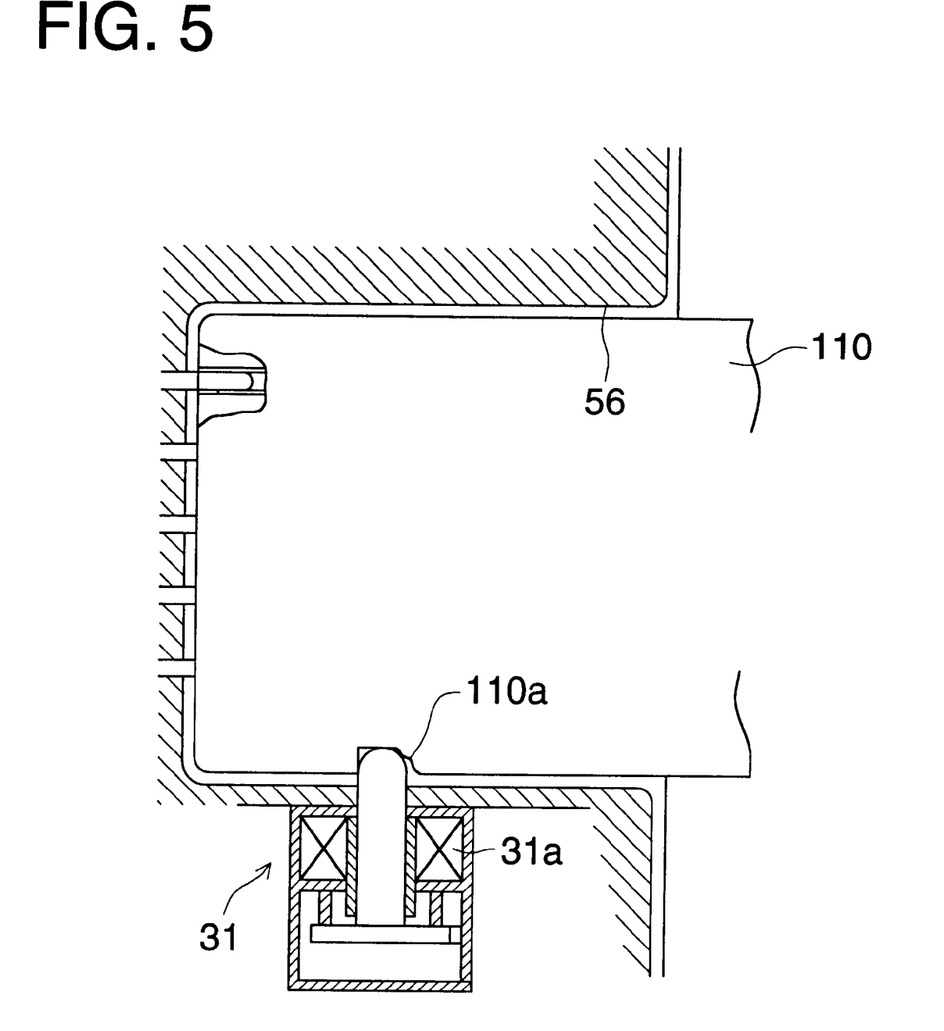
FIG. 5 is a partial sectional view showing an example of the locking mechanism for the memory card.

As for the aforesaid locking mechanism (locking means) for locking the memory card 110, such one having the structure as shown in FIG. 5 can be used.

In FIG. 5, there is provided the plunger 31 on the side wall of the aforesaid opening for insertion 56, and in the normally mounted state of the memory card 110, upon plunging of the plunger 31 into the opening for insertion 56 by applying an electric current in the electromagnetic coil 31a, the front edge of said plunger 31 is put in the notch portion 110a provided in the memory card as designed to hinder the movement of the memory card 110 in the direction of drawing out, the right direction in FIG. 5; thus the memory card 110 is locked in the mounting state to make it unable to be drawn out. In addition, the locking mechanism (locking means) is not to be limited to that shown in FIG. 5.

Figure 6:
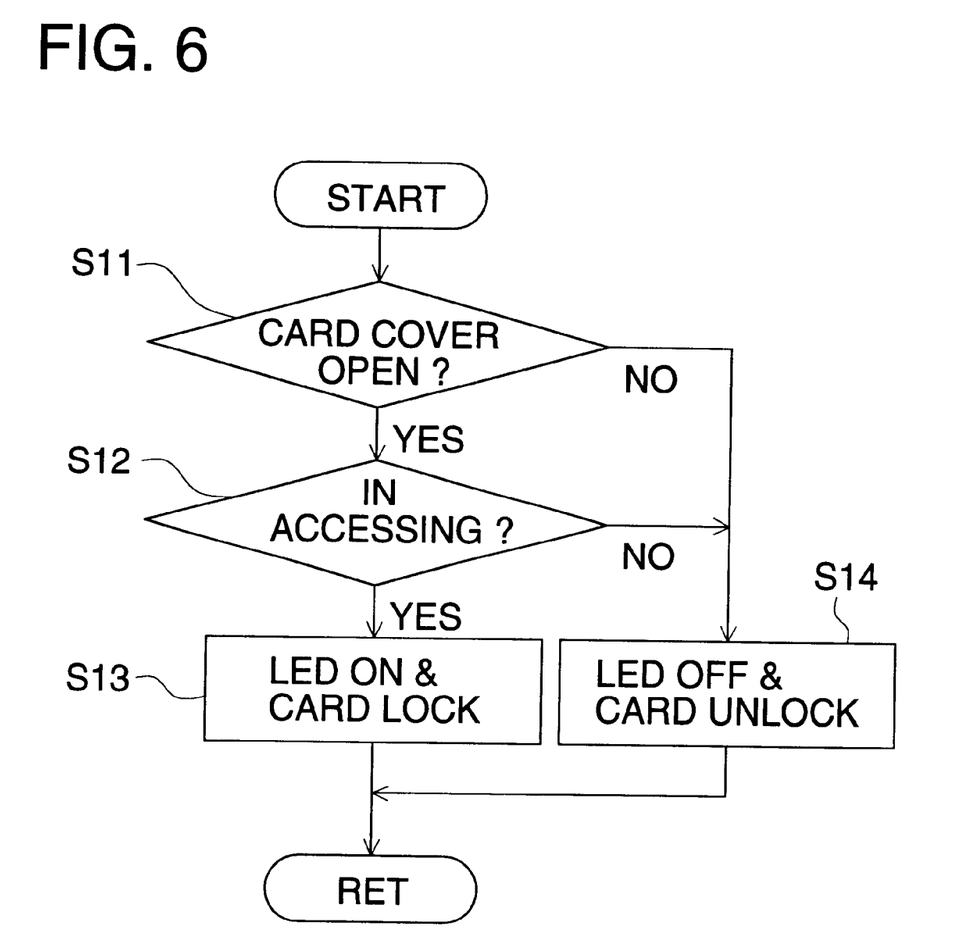
FIG. 6 is a flow chart showing the control to avoid the demounting of the memory card in accessing by the warning and locking.

As shown in the flow chart of FIG. 6, if the opening of the aforesaid card cover 57 is detected by the aforesaid card cover detecting switch 120 (step 11), and if the access to the memory card 110 is being done (step 12), the aforesaid locking mechnism is made to effect locking the memory card 110 in the mounting state, and at the same time, the warning by means of the LED 121 and/or the buzzer 122 is made (step 13).

On the other hand, if the card cover 57 is closed (regardless of the access to the memory card 110), or if the access is not being done even with the card cover opened, the locking by the aforesaid locking mechanism is made released, and the warning by the LED 121 and/or the buzzer 122 is made to be off (step 14).

By such structure as this, it can be prevented that the memory card 110 in accessing is taken out, even if the user does not notice the warning or the warning is neglected, because the memory card is mechanically locked together with making the warning. In this occasion, even if only the locking of the memory card 110 is practiced without making the warning by the LED 121 and/or the buzzer 122, it is possible to inform the user of being in the access by the fact that the memory card 110, which he attemts to draw out, is locked. However, it is more favorable if the warning is issued when the locking is effected, because that makes it clear that the locking is due to the accessing.

Now, in such a digital still camera as this embodiment having the structure to do reclaiming, if the user attempts to demount the memory card 110 during reclaiming, the memory card 110 is to be unable to demount until the completion of reclaiming which requires a comparatively long time; that may make the convenience in using worse. On the other hand, the aforesaid reclaiming is carried out for every erasing block unit one by one serially in time, hence discontinuing the process before the completion of erasing all blocks makes no serious effect, by carrying out the remainder when the memory card 110 is mounted again.

Figure 7:
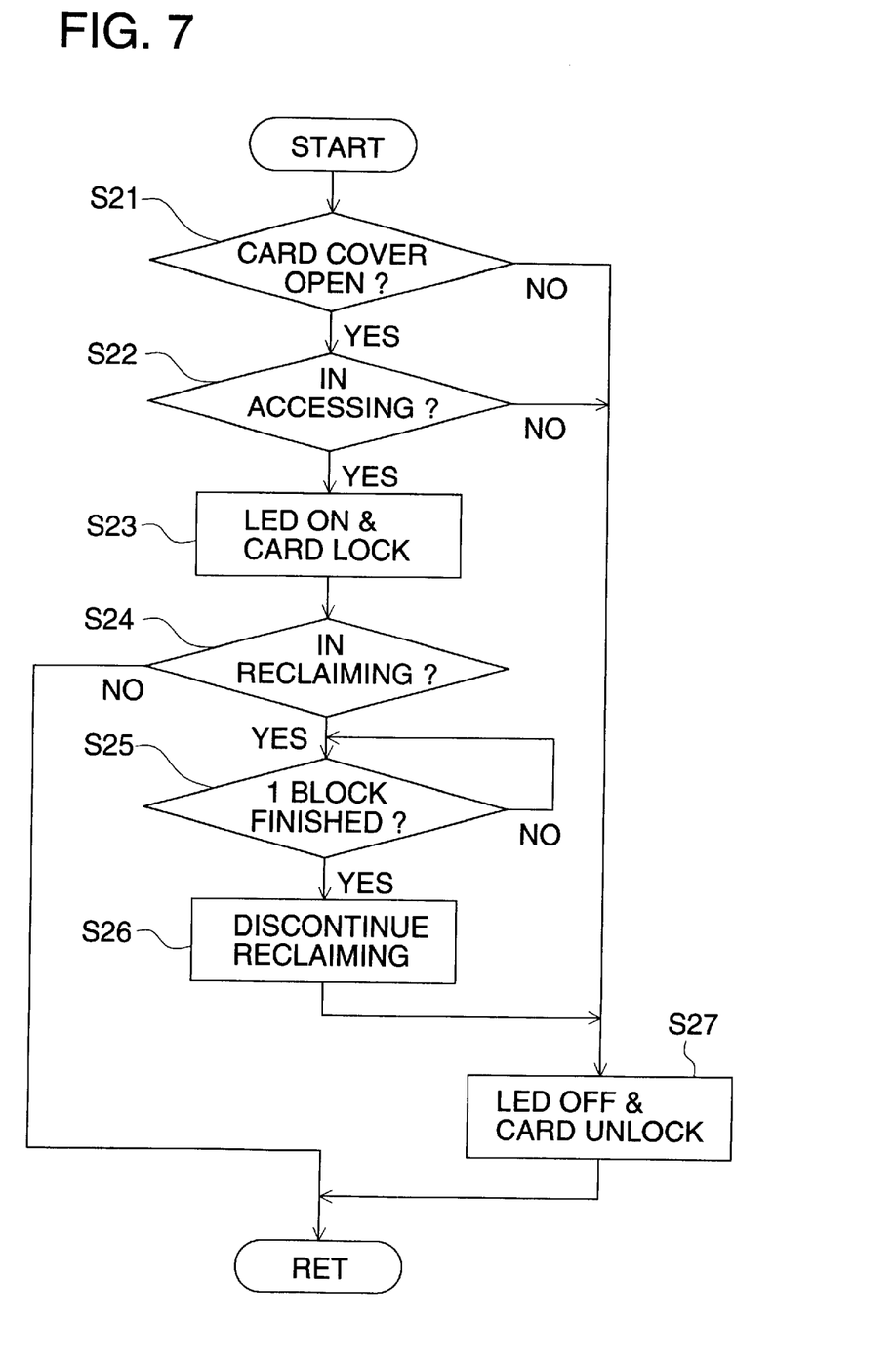
FIG. 7 is a flow chart showing the control to avoid the demounting of the memory card in accessing by the warning and locking, and also to cause it to be carried out in a short time for the memory card to be demounted by discontinuing the process.

Therefore, as shown in the flow chart of FIG. 7, if the card cover 57 is opened (step 21), and if it happens during the access (step 22), the warning by the aforesaid LED 121 or the buzzer 122 (and/or locking by the locking mechanism) is made to be on (step 23), but if the access is for reclaiming (step 24), upon finishing erasing the unit in processing at that time (step 25), through discontinuing the reclaiming to stop the access to the memory card 110 (step 26), the drawing out of the memory card 110 may be allowed by releasing the aforesaid warning and/or locking (step 26).

Figure 8:
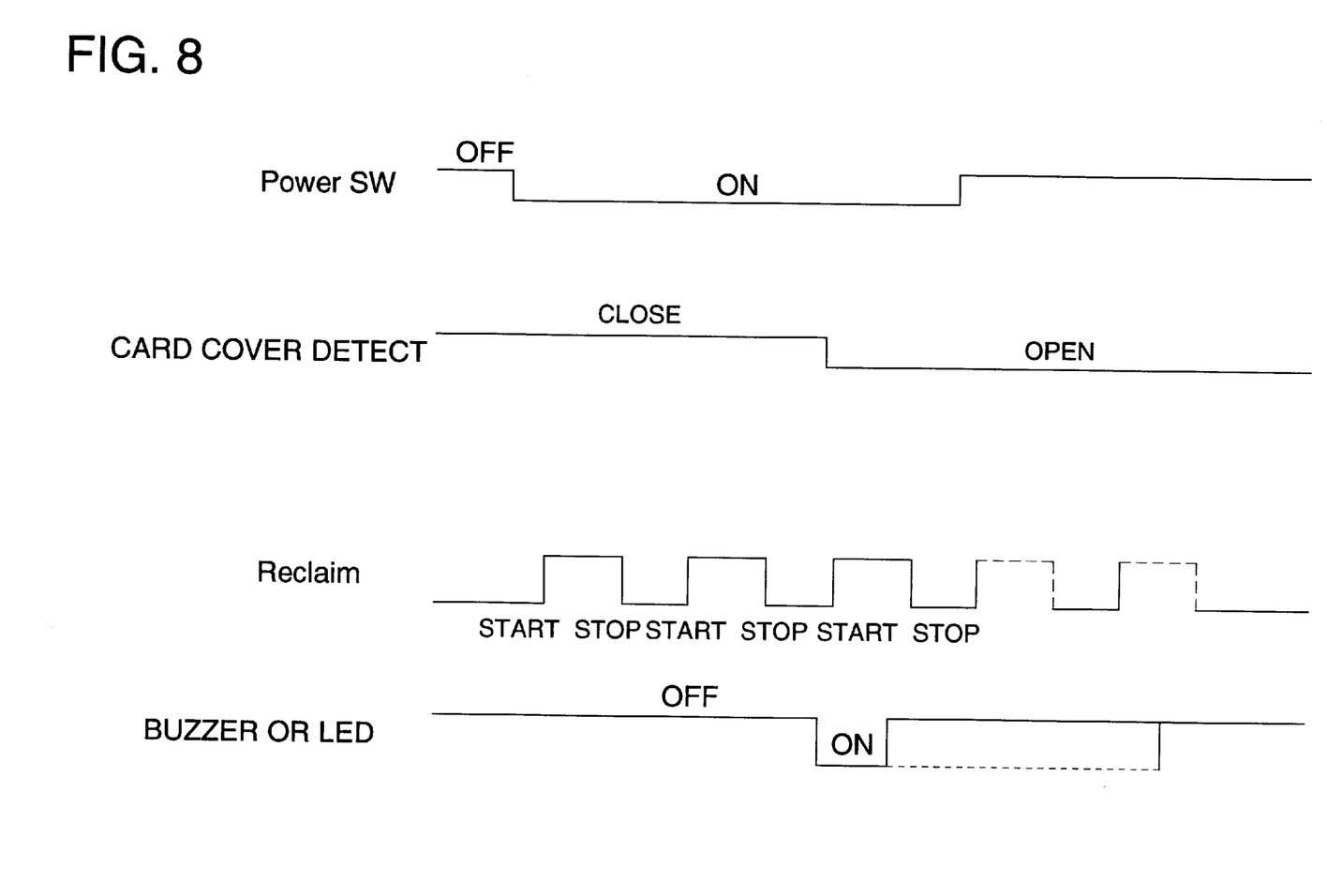
FIG. 8 is a timing chart showing how the aforesaid warning and discontinuing the process is made.

In other words, as shown in the timing chart of FIG. 8, the aforesaid reclaiming is to carry out the erasing process for each erasing block unit one by one serially in time, hence, if the card cover 57 is opened during reclaiming, erasing is done only for the block in processing, and the access to the memory card 110 is stopped by discontinuing the process without completing the erasing for the erasing blocks supposed to be processed subsequently to make the memory card 110 enter in the demountable state.

By the structure as mentioned above, on the occasion of demounting the memory card 110, it is able to be carried out for the memory card 110 to be demounted with a waiting time required for the processing of one erasing block at the longest; therefore, it is prevented for the convenience of use to be made reduced due to forcing the user to wait for a long time.

Figure 9:
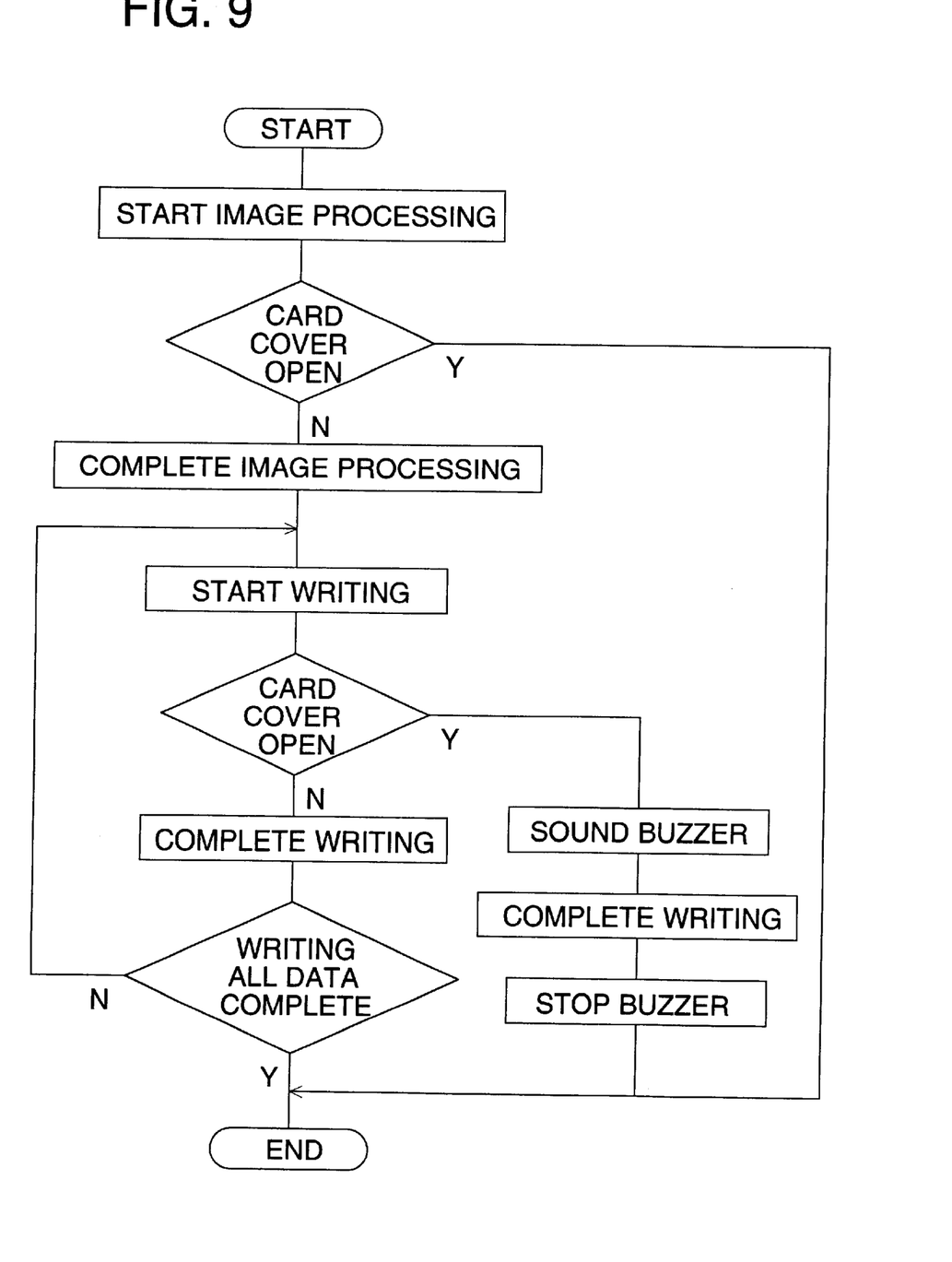
FIG. 9 is a flow chart showing another embodiment in which the card is allowed to be pulled out after the image data of a block are written in the memory card.

In the flowchart in FIG. 9, the image processing includes the processing such as the noise reducing process and the gain adjustment which are conducted by the pre-processing circuit 106 and applied to the analog image signals outputted from the CCD 103 and the processing such as the brightness processing, the color processing and the data compression processing which are conducted by the signal processing circuit 108 and applied to the digital image signals outputted from the A/D converter 107. If the card cover is not opened during the image processing and the image processing is completed, the writing the image data into the card is started. On the other hand, if the card cover is opened during the image processing, the warning to notify the card cover being opened for the user is not conducted. This is because, even if the user pulls out the card during and if the card is not accessed during the image processing, there is no fear that the data in the card are broken. Further, in the case that the card cover is opened during the image processing, it may be possible that the image processing is interrupted and the image data is not written in the card. Also, it may be possible that when the card cover being opened is judged, the image processing is completed and the interrupting writing image data may conducted immediately before writing the image data. By doing so, when the card is pulled out by the user after the card cover is opened, since the card is not accessed, it may be possible to prevent the card itself or the data in the card from being broken. Further, if the card cover is opened during the image processing, the image processing is continued as it is conducted. Then, when the image data are written in the card, if the card is connected with the camera and if the card cover is closed, it may be permissible to write the image data in the card as the image without interruption.

Generally, the image data are written into the card for each block of the image data as a writing unit. This is due to the following reasons: In the device like a digital camera, it may be difficult from the view of cost and scale to use a memory like the image accumulating memory 113 without freely. The amount of data capable of being written at a time is limited depending on the type of the card. Further, after writing the image data of a block into the card is started, if the card is pulled out before the writing the image data of the block is completed, the card itself or the data stored in the card may be broken.

Accordingly, in the present embodiment, after writing the image data of a block into the card is started, if the card cover being opened is detected, it may be possible to warn the user to change the mind so as not to pull out the card by making the buzzer sound. With this embodiment, if the card is prevented from being pulled out during the writing, it can avoid to break the card itself or the date stored in the card. After the writing the image data of the block is completed, serial photographing operations are completed even if the writing all the image data is not completed.

After the sounding of the buzzer is started, when the writing the image data of the block is completed, the sounding of the buzzer is stopped so as to notify that the user can pull out the card. When the writing the image data in the card is not conducted, even if the card is pulled out, there is no fear that the card itself and the image data stored in the card may be broken.

If the card being opened is not detected during the writing, after the writing the image data of the block is completed, the writing the image data of a next block is started. After the writing the image data of all the image data is completed, serial photographing operations are completed.

Further, in the case that the card cover is opened during the writing the image data of one block, before the writing the image data of a next block is started after the writing the image data of the block is completed, if the card is connected with the camera and if the card cover is closed, it may be permissible to conduct the writing the image data into the card without interruption.

Moreover, in the above description, the operational state of the memory card 110 being about to be demounted is judged the opening of the card cover 57, but it should not be confined to this method. For example, in case where the structure is such that the memory card 110 mounted in the opening for insertion is drawn out by the action of the eject button, it will also do well that the warning means or the locking means is actuated by detecting that said eject button is touched or slightly depressed and by regarding such state as the operational state of the memory card 110 being about to be demounted. Further, in case where the structure is such that the memory card 110 is fixed by a mechanical locking mechanism in addition to the fitting of the terminals, it will also do well to judge the operational state of the memory card 110 being about to be demounted by the carrying out of the operation of the button for releasing said locking mechanism.

What is claimed is:

1. A camera, comprising:
    a photographing element for converting image information into electric signals and for outputting image data;
    a memory mounting section on which a memory is mounted;
    control means for instructing writing the image data in the memory;
    accessing detecting means for detecting a condition that the memory is accessed and for outputting an accessing detecting signal;
    demounting detecting means for detecting a condition that the memory is being demounted from the memory mounting section and for outputting a demounting detecting signal; and
    accessing interrupting means for interrupting processes when a current process unit of a plurality of process units is completed in response to the demounting detecting signal, wherein the memory is accessed to carry out the processes by implementing the plurality of process units in sequence,
    wherein the memory is a flash memory in which invalid data are generated when the data are rewritten and the control means conducts an erasing process to create empty region by erasing the invalid data for each erasing block unit, and wherein when the erasing process is conducted for a current erasing block unit when the demounting detecting means outputs the demounting detecting signal, the accessing interrupting means interrupts the erasing process when the erasing process for the current erasing block unit is completed.

2. A camera, comprising:
    a photographing clement for converting image information into electric signals and for outputting image data,
    control means for instructing writing the image data in a memory in which invalid data are generated when the image data are rewritten, and for conducting an erasing process to create an empty region by erasing the invalid data for each of erasing block units in the memory in sequence; and
    accessing interrupting means for allowing the control means to interrupt the erasing process for another erasing block unit when the erasing process for a current erasing block unit of the erasing block is completed.

3. The camera of claim 2, further comprising:
    a memory mounting section on which the memory is mounted.

4. The camera of claim 3, further comprising:
    demounting detecting means for detecting a condition that the memory is being demounted from the memory mounting section and for outputting a demounting detecting signal,
    wherein the accessing interrupting means interrupts the erasing process when the erasing process for a current erasing block unit of the erasing block units is completed in response to the demounting detecting signal.

* * * * *